United States Patent
Park et al.

(10) Patent No.: US 10,569,741 B1
(45) Date of Patent: Feb. 25, 2020

(54) REMOTE CONTROLLER, VEHICLE FOR COMMUNICATING WITH THE SAME AND METHOD FOR CONTROLLING THE VEHICLE

(71) Applicants: HYUNDAI MOTOR COMPANY, Seoul (KR); KIA MOTORS CORPORATION, Seoul (KR)

(72) Inventors: Mingu Park, Pocheon-si (KR); Hyung Gyu Ra, Suwon-si (KR); Jaekwon Jung, Yongin-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 16/175,095

(22) Filed: Oct. 30, 2018

(30) Foreign Application Priority Data

Aug. 8, 2018 (KR) .................. 10-2018-0092125

(51) Int. Cl.
 *B60R 25/24* (2013.01)
 *G07C 9/00* (2006.01)
 *B60R 25/20* (2013.01)

(52) U.S. Cl.
 CPC .......... *B60R 25/245* (2013.01); *B60R 25/209* (2013.01); *G07C 9/00309* (2013.01); *B60R 2325/108* (2013.01); *G07C 2009/00333* (2013.01); *G07C 2009/00412* (2013.01); *G07C 2009/00507* (2013.01); *G07C 2009/00555* (2013.01)

(58) Field of Classification Search
 CPC . H04W 12/06; H04W 4/80; H04W 12/00407; H04W 12/00522; H04W 12/02; H04W 12/08; H04W 4/12; H04W 4/21; H04W 12/00403; H04W 12/00504
 USPC .......................................... 340/5.8
 See application file for complete search history.

(56) References Cited

U.S. PATENT DOCUMENTS

| 6,803,882 | B2 | 10/2004 | Hoetzel |
| 7,719,213 | B2 | 5/2010 | Herman et al. |
| 9,963,109 | B2 | 5/2018 | Luo et al. |
| 2013/0076484 | A1* | 3/2013 | Nishiguchi ........ G07C 9/00309 340/5.64 |
| 2017/0158168 | A1* | 6/2017 | Nantz ................ G07C 9/00309 |

FOREIGN PATENT DOCUMENTS

JP 2013-83096 A 5/2013

* cited by examiner

*Primary Examiner* — Mark S Blouin
(74) *Attorney, Agent, or Firm* — Brinks Gilson & Lione

(57) ABSTRACT

A vehicle communicating with a remote controller is provided. A vehicle includes a plurality of car antennas; a storage configured to store a distance value between the first and second key antennas; and a controller configured to select at least two of the plurality of car antennas, control transmission of signals through the selected at least two car antennas, obtain a distance value between the first and second key antennas of the remote controller based on the received signal strength and the transmission strength of the at least two car antennas when a received signal strength of at least two signals received by the first key antenna and a received signal strength value of at least two signals received by the second key antenna are received from the remote controller, and authenticate the remote controller based on the obtained distance value and the distance value stored in the storage.

22 Claims, 9 Drawing Sheets

FIG. 8

|     | 201 | 202 |
| --- | --- | --- |
| 101 | V11 | V12 |
| 102 | V21 | V22 |
| 103 | V31 | V32 |
| 104 | V41 | V42 |
| 105 | V51 | V52 |
| 106 | V61 | V62 |

(a)

|     | 201 | 202 | x   |
| --- | --- | --- | --- |
| 101 | S11 | S12 | x1  |
| 102 | S21 | S22 | x2  |
| 103 | S31 | S32 | x3  |
| 104 | S41 | S42 | x4  |
| 105 | S51 | S52 | x5  |
| 106 | S61 | S62 | x6  |

(b)

REMOTE CONTROLLER, VEHICLE FOR COMMUNICATING WITH THE SAME AND METHOD FOR CONTROLLING THE VEHICLE

CROSS-REFERENCE TO RELATED APPLICATION

The present application claims priority to and the benefit of Korean Patent Application No. 10-2018-0092125, filed on Aug. 8, 2018, which is incorporated herein by reference in its entirety.

FIELD

The present disclosure relates to a remote controller for preventing theft of a vehicle, a vehicle for communicating with the same and a method for controlling the vehicle.

BACKGROUND

The statements in this section merely provide background information related to the present disclosure and may not constitute prior art.

A vehicle is an apparatus to drive on the road by driving of vehicle wheels for the purpose of transporting persons or cargo.

The vehicle may be locked or unlocked, and also may be turned on or off by a key or a remote controller.

The remote controller may allow a driver to open and close a door and a trunk as well as to start an engine even when a driver is only carrying it.

The remote controller may perform bidirectional communication with the vehicle so that the driver can open the door or the trunk automatically by unlocking the door of the vehicle when the driver is close to the vehicle without performing any manual operation. When the start button is operated without starting manually at the time of driving, the vehicle may be started.

The vehicle whose door opening/closing, door locking and starting are controlled by communication with the remote controller may indirectly communicate with the remote controller by a repeater relaying communication. However, it caused problems that the vehicle could be stolen.

SUMMARY

Therefore, it is an aspect of the present disclosure to provide a vehicle capable of obtaining a distance value between two key antennas provided in a remote controller based on distance information with the remote controller and performing authentication on the remote controller based on the obtained distance value, and a method for controlling the vehicle It is another aspect of the present disclosure to provide a remote controller capable of including two key antennas spaced apart from each other by a predetermined distance, and performing authentication by transmitting information on received signal strengths received by the two key antennas corresponding to the reception of signals sequentially transmitted through at least two car antennas provided in the vehicle, to the vehicle.

Additional aspects of the disclosure will be set forth in part in the description which follows and, in part, will be obvious from the description, or may be learned by practice of the disclosure.

In accordance with an aspect of the present disclosure, a remote controller includes: a first key antenna; a second key antenna disposed at a predetermined distance from the first key antenna; a detector configured to detect the strength of a signal received by the first key antenna and the second key antenna, respectively; and a controller configured to control transmission of a received signal strength value of at least two signals received by the first key antenna and a received signal strength value of at least two signals received by the second key antenna detected by the detector.

The remote controller may further include: a communicator configured to perform communication with a vehicle. The controller may convert information corresponding to the received signal strength value of the at least two signals received by the first key antenna and the received signal strength value of the at least two signals received by the second key antenna into a high frequency signal, and control the communicator to transmit the converted high frequency signal.

The remote controller may further include: an inputter configured to receive an user input. The controller may convert a control signal corresponding to the user input received by the inputter into the high frequency signal, and control the communicator to transmit the converted high frequency signal.

The first and second key antennas may include a low frequency antenna for receiving a signal for authentication transmitted from at least two car antennas provided in a vehicle.

The controller may control transmission of encryption information for starting up when the authentication is successful.

In accordance with another aspect of the present disclosure, a vehicle includes: a plurality of car antennas configured to be spaced apart from each other; a storage configured to store a distance value between first and second key antennas provided in a remote controller; and a controller configured to select at least two of the plurality of car antennas, control transmission of signals through the selected at least two car antennas, obtain a distance value between the first and second key antennas of the remote controller based on the received signal strength values and the transmission strength value of the at least two car antennas when a received signal strength value of at least two signals received by the first key antenna and a received signal strength value of at least two signals received by the second key antenna are received from the remote controller, and perform an authentication of the remote controller based on the obtained distance value and the distance value stored in the storage.

The storage may store distance values of the plurality of car antennas. The controller may obtain a distance value between the selected at least two car antennas and the first and second key antennas based on the transmission strength values of the selected at least two car antennas and the received signal strength values for at least two signals received respectively by the first and second key antennas, and obtain the distance value between the first and second key antennas of the remote controller based on the obtained distance value and the distance value between the selected two car antennas among the distance values stored in the storage.

The controller may obtain a distance value between the one car antenna and the first key antenna based on the transmission strength value of one of the selected at least two car antennas and the received signal strength value received by the first key antenna, obtain a distance value between the one car antenna and the second key antenna based on the transmission strength value of the one car antenna and the received signal strength value of the signal received by the second key antenna, obtain a distance value between the other car antenna and the first key antenna based on the transmission strength value of the other car antenna among the selected two car antennas and the received signal strength value of the signal received by the first key antenna, and obtain a distance value between the other car antenna and the second key antenna based on the transmission strength value of the other car antenna and the received signal strength value of the signal received by the second key antenna.

The controller may obtain a distance value between the first and second key antennas based on the transmission strength value of the plurality of car antennas during communication between the plurality of car antennas and the first and second key antennas, the received signal strength value of the first key antenna for signal reception of the plurality of car antennas and the received signal strength value of the second key antenna for signal reception of the plurality of car antennas, and store the obtained distance value in the storage as a reference value.

The controller may compare the encryption information transmitted from the remote controller with previously stored encryption information to perform the immobilizer authentication when the authentication of the remote controller is successful, and control the starting when the immobilizer authentication is successful.

The vehicle may further include: a communicator configured to receive a high frequency signal transmitted from the remote controller. The controller may demodulate the received high frequency signal when the high frequency signal is received to obtain the received signal strength values of the first and second key antennas.

The vehicle may further include: side mirrors; and a mirror driver configured to fold and unfold the side mirrors. The controller may control the mirror driver so that the side mirrors are folded or unfolded when the authentication of the remote controller is successful.

The vehicle may further include: lights; and a light driver configured to turn on and off the lights. The controller may control the light driver so that the lights are turned on or off when the authentication of the remote controller is successful.

The vehicle may further include: a door; and a locking part configured to lock and unlock the door. The controller may control the locking part so that the door are locked and unlocked when the authentication of the remote controller is successful.

The plurality of car antennas may include a low frequency antenna for transmitting an authentication signal for authenticating the remote controller.

The vehicle may further include: a warning part, wherein the controller is configured to control driving of the warning part when the authentication of the remote controller fails.

In accordance with another aspect of the present disclosure, a method for controlling a vehicle includes: selecting at least two of a plurality of car antennas; controlling transmission of signals through the selected at least two car antennas; obtaining a distance value between first and second key antennas of a remote controller based on the received signal strength values and the transmission strength value of the at least two car antennas when a received signal strength value of at least two signals received by the first key antenna and a received signal strength value of at least two signals received by the second key antenna are received from the remote controller; identifying whether an authentication of the remote controller is successful based on the obtained distance value and a previously stored distance value; controlling operation of at least one load provided in a vehicle when the authentication of the remote controller is successful; and outputting warning information when the authentication of the remote controller fails.

The obtaining of the distance value between the first and second key antennas of the remote controller may include obtaining a distance value between the selected at least two car antennas and the first and second key antennas based on the transmission strength values of the selected at least two car antennas and the received signal strength values for at least two signals received respectively by the first and second key antennas; and obtaining the distance value between the first and second key antennas of the remote controller based on the obtained distance value and the distance value between the previously stored at least two car antennas.

The obtaining of the distance value between the selected at least two car antennas and the first and second key antennas may include obtaining a distance value between the one car antenna and the first key antenna based on the transmission strength value of one of the selected at least two car antennas and the received signal strength value received by the first key antenna; obtaining a distance value between the one car antenna and the second key antenna based on the transmission strength value of the one car antenna and the received signal strength value of the signal received by the second key antenna; obtaining a distance value between the other car antenna and the first key antenna based on the transmission strength value of the other car antenna among the selected two car antennas and the received signal strength value of the signal received by the first key antenna; and obtaining a distance value between the other car antenna and the second key antenna based on the transmission strength value of the other car antenna and the received signal strength value of the signal received by the second key antenna.

The method may further include: obtaining a distance value between the first and second key antennas based on the transmission strength value of the plurality of car antennas during communication between the plurality of car antennas and the first and second key antennas, the received signal strength value of the first key antenna for signal reception of the plurality of car antennas and the received signal strength value of the second key antenna for signal reception of the plurality of car antennas; and storing the obtained distance value as a reference value.

The controlling of operation of at least one load may include requesting transmission of encryption information to the remote controller when the authentication of the remote controller is successful; performing an immobilizer authentication by comparing the received encryption information with previously stored encryption information when the encryption information is received from the remote controller; and controlling the starting when the immobilizer authentication is successful.

The controlling of operation of at least one load may include unlocking a door; unfolding side mirrors; and turning on lights.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 8 is a view illustrating an example for obtaining a signal reception strength value and a distance value between a plurality of car antennas of the vehicle and two key antennas of the remote controller in one form of the present disclosure.

Figure 1:
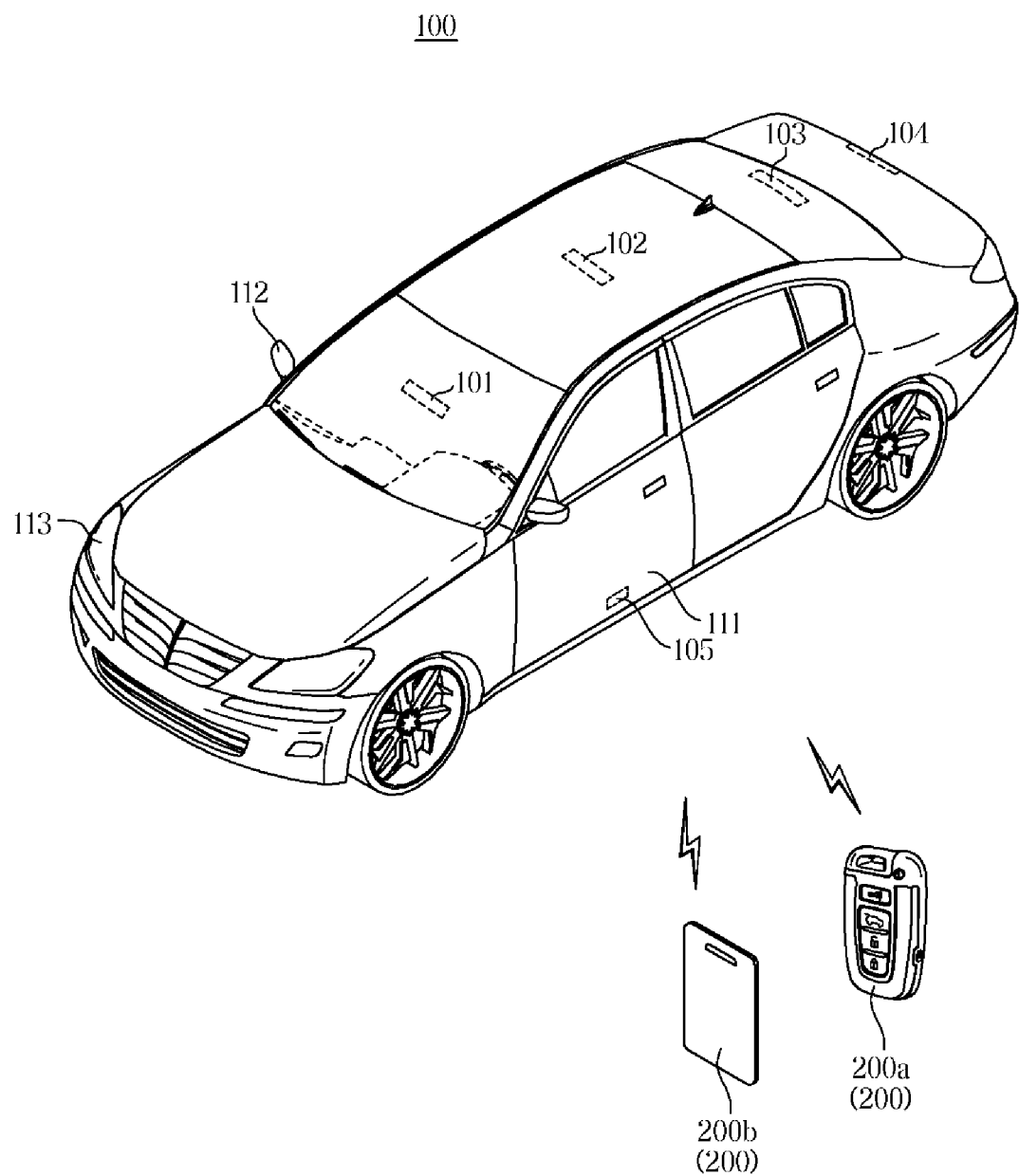
FIG. 1 is a view illustrating an external appearance of a vehicle and a remote controller in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Like reference numerals refer to like elements throughout the specification. Not all elements of forms of the present disclosure will be described, and description of what are commonly known in the art or what overlap each other in the forms will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and some forms of the present disclosure will be described with reference to accompanying drawings.

FIG. 1 is a view illustrating an external appearance of a vehicle and a remote controller in some forms of the present disclosure, which will be described with reference to FIG. 2.

Figure 2:
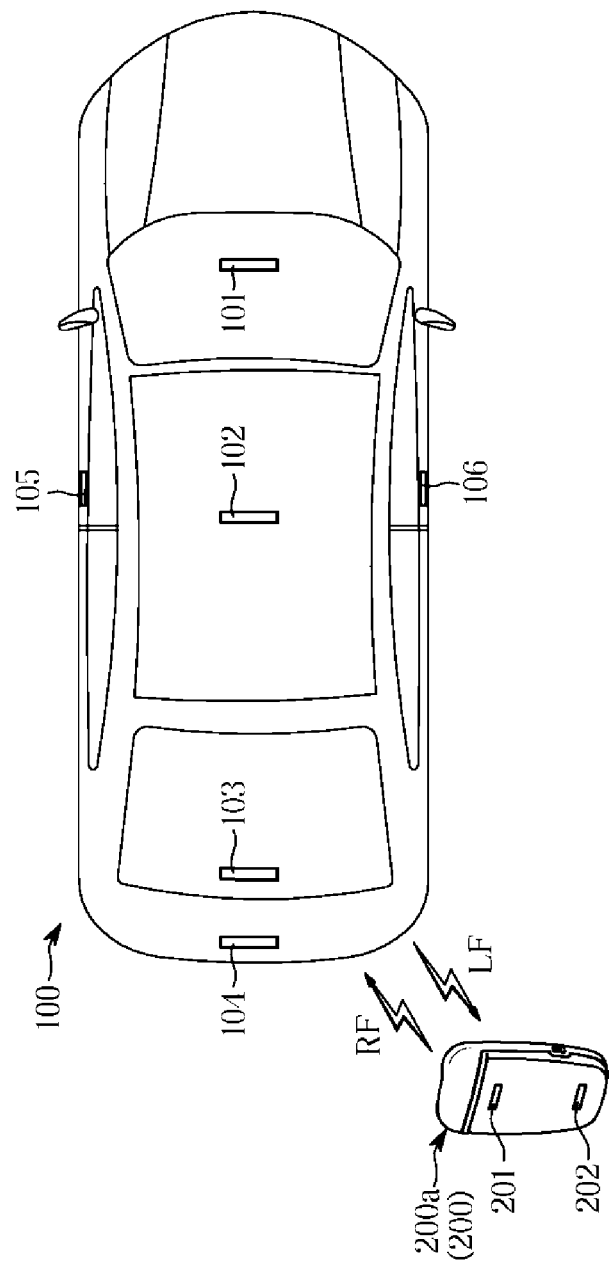
FIG. 2 is a view illustrating an antenna provided in the vehicle and the remote controller in one form of the present disclosure.

FIG. 2 is a view illustrating an antenna provided in the vehicle and the remote controller in some forms of the present disclosure.

A vehicle 100 may include a body with exterior and interior parts, and remaining part, i.e., chassis on which mechanical devices required for driving are installed.

An exterior part of the body includes a front bumper, a hood, a roof panel and a rear bumper, and a plurality of window glasses. The plurality of window glasses may include side window glasses, quarter window glasses installed between the pillars, which may not be opened and closed, a rear window glass installed on the back, and a front window glass installed on the front.

As illustrated in FIG. 1, the vehicle 100 may include a tailgate for opening or closing a trunk that forms a room for keeping load, at least two doors 111 for opening or closing the space where people are seated, side mirrors 112 for allowing the driver to see a rear view of the vehicle 100, and lights 113 for enabling the driver to catch information in the neighborhood while keeping his/her eyes forward and perform signaling and communication for other vehicles and pedestrians.

The door 111 may be automatically opened and closed based on the information input by a user, and may be locked and unlocked in the closed state. That is, the door 111 may be provided with an opening/closing part for opening/closing the door 111 and a locking part for locking/unlocking the door 111.

The vehicle 100 may include at least two car antennas for communicating with at least one remote controller 200 (200a, and 200b).

Someforms of the present disclosure describe six car antennas 101 to 106.

The vehicle 100 may include six car antennas 101 to 106 spaced apart from each other.

As illustrated in FIG. 2, the vehicle 100 may include a first car antenna 101 provided on the front window glass, a second car antenna 102 provided on the roof panel, a third car antenna 103 provided on the rear window glass, and a fourth car antenna 104 provided on the rear bumper, a fifth car antenna 105 provided on the driver's seat door, and a sixth car antenna 106 provided on the passenger's door.

The arrangement positions of the car antennas 101 to 106 are not limited thereto and can be variously changed in some forms of the present disclosure.

The car antennas 101 to 106 may or may not be able to communicate with a remote controller according to the distance between the vehicle 100 and the remote controller 200.

That is, since the car antennas 101 to 106 provided in the vehicle only transmit a signal for recognizing the presence of the remote controller 200, the car antennas 101 to 106 may transmit the information amount smaller than the predetermined information amount and perform a low frequency communication that can perform long distance communication with the same power.

The car antennas 101 to 106 may be a low frequency (LF) antenna.

The plurality of car antennas may selectively transmit radio waves to the remote controller 200.

The vehicle 100 may communicate with the remote controller through the plurality of car antennas. When the remote controller 200 is located at a communicable distance that enables communication, that is, when the vehicle 100 is located close to the remote controller 200, the vehicle 100 may automatically communicate with the remote controller 200. When the remote controller 200 is successfully authenticated, it is possible to unlock the doors of the driver's seat and the passenger's seat of the vehicle 100 or to control the start of the vehicle 100 without any manual operation.

When the vehicle is located close to the remote controller 200 (200a and 200b), the vehicle may automatically perform communication and, when the authentication is successful, causes the lights 113 of the vehicle 100 to turn on or unfold the side mirrors 112.

The vehicle 100 may control the lights 113 to be turned off or adjust the angle of the side mirrors 112 so that the side mirrors 112 is folded when the remote controller 200 (200a and 200b) is out of a predetermined distance or more.

In addition, the vehicle 100 may further include a high frequency antenna for receiving a radio frequency (RF) signal transmitted from the remote controller 200.

As illustrated in FIG. 1, the remote controller 200 (200a, and 200b) communicating with the vehicle 100 may include a fob type remote controller 200a and a card type remote controller 200b.

The fob type remote controller 200a and the card type remote controller 200b may perform bidirectional communication with the vehicle 100.

The fob type remote controller 200a and the card type remote controller 200b may transmit an authentication signal for automatically communicating with the vehicle 100 when a signal is received from the vehicle before transmitting a control signal to the vehicle 100.

The fob type remote controller 200a and the card type remote controller 200b may include a low frequency (LF) antenna for receiving a low frequency signal of the vehicle 100.

The remote controller 200 (200a, and 200b) may include two low frequency antennas.

That is, when the fob type remote controller 200a and the card type remote controller 200b are located close to the vehicle 100, the fob type remote controller 200a and the card type remote controller 200b may automatically communicate with the vehicle 100 using two low frequency antennas. When the signal is received from the vehicle 100, the fob type remote controller 200a and the card type remote controller 200b may transmit the authentication signal for automatically communicating with the vehicle 100 using the two low frequency antennas.

In some forms of the present disclosure, the two low frequency antennas 201 and 202 provided in the fob type remote controller 200a will be described as an example. In addition, two low frequency antennas provided in the fob type remote controller 200a are described as a first key antenna 201 and a second key antenna 202 for distinguishing from a first to a sixth car antenna provided in the vehicle 100.

As illustrated in FIG. 2, the fob type remote controller 200a may include the first key antenna 201 and the second key antenna 202 spaced apart from each other by the predetermined distance in a body.

The first key antenna 201 may transmit the authentication signal in response to reception of signals of at least two car antennas of the plurality of car antennas 101 to 106. The second key antenna 202 may transmit the authentication signal in response to reception of signals of at least two car antennas of the plurality of car antennas 101 to 106 provided in the vehicle 100.

The authentication signal may be a signal for authenticating the remote controller 200, and may include a strength signal corresponding to a received signal strength of each key antenna of the remote controller 200, and may include an identification signal having identification information for each key antenna of the remote controller 200.

The fob type remote controller 200a may receive a user command from the user and transmit the control signal corresponding to the received user command to the vehicle 100 when the authentication is successful.

When the card type remote controller 200b succeeds in authentication, the card type remote controller 200b may transmit the control signal for unlocking the doors of the driver's seat and the passenger's seat of the vehicle 100, or transmit the control signal for starting without any manual operation.

The remote controller 200 (200a, and 200b) may transmit the control signal to cause the lights 113 to turn on or perform unfolding of the side mirrors 112 when the authentication succeeds and is located close to the vehicle 100.

The remote controller 200 (200a, and 200b) may further include at least one high frequency antenna for transmitting the control signal.

That is, in addition to the authentication signal, the remote controller 200 may further transmit at least one of a door unlocking control signal, a start control signal, a light control signal, and a side mirror folding control signal. As such, the remote controller 200 may transmit a relatively larger number of signals than the vehicle 100.

In addition, when the door of the vehicle is unlocked by using the remote controller 200 in a state where the distance between the vehicle 100 and the remote controller 200 is long, the inside of the vehicle can be stolen by another person, so it is necessary to enable communication between the vehicle 100 and the remote controller 200 within the predetermined distance.

Therefore, the remote controller 200 may further include the high frequency antenna for carrying out high frequency communication capable of transmitting a larger amount of information than a predetermined amount of information and performing a short-range communication with respect to the same power.

Figure 3:
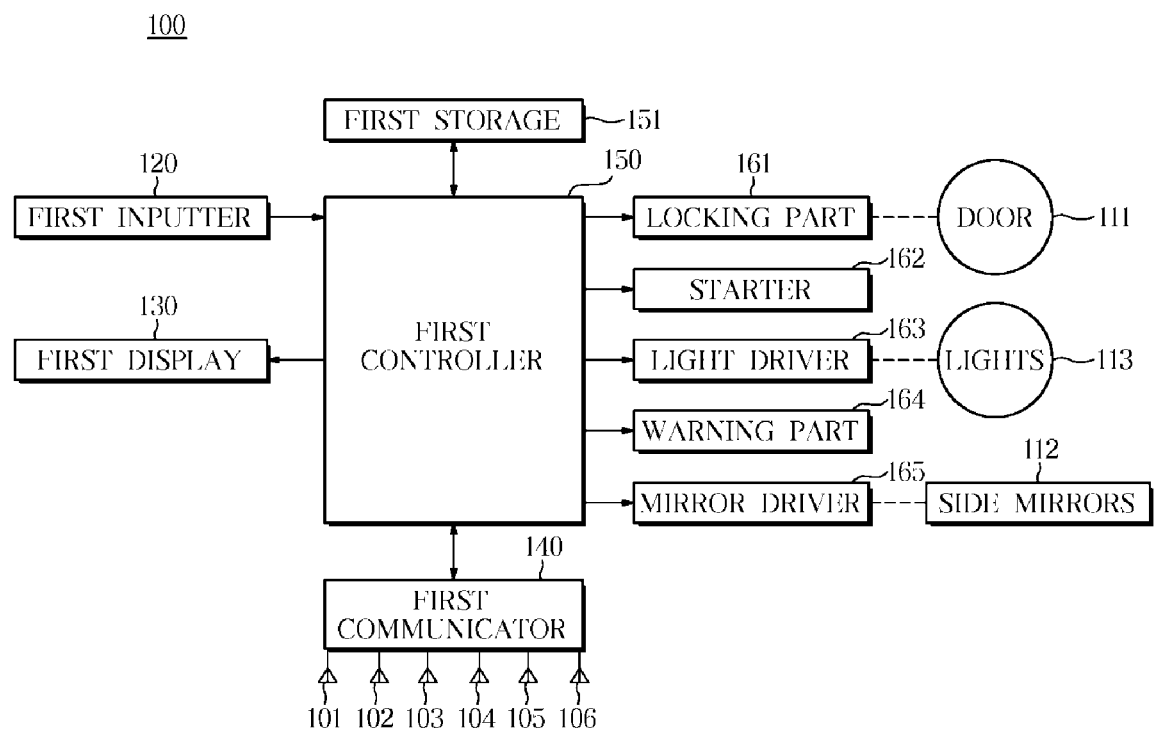
FIG. 3 is a control block diagram of the vehicle in one form of the present disclosure.
Figure 4:
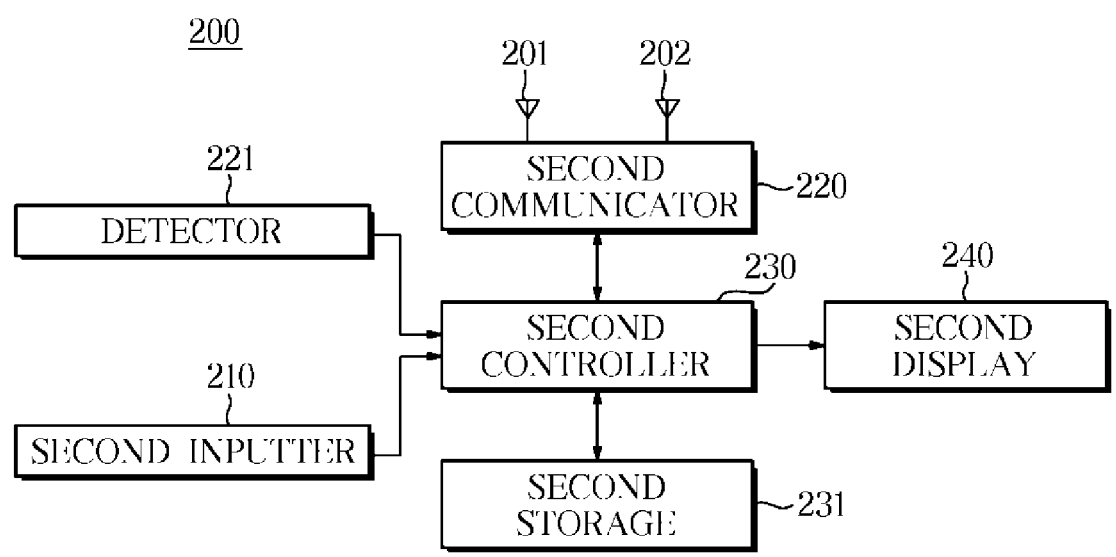
FIG. 4 is a control block diagram of the remote controller for performing communication with the vehicle in one form of the present disclosure.

FIG. 3 is a control block diagram of the vehicle in some forms of the present disclosure and FIG. 4 is a control block diagram of the remote controller for performing communication with a vehicle in some forms of the present disclosure.

In order to distinguish between the components of the vehicle 100 and the components of the remote controller 200, the term "first" is used to describe components of the vehicle 100 and the term "second" is used to describe components of the remote controller 200.

As illustrated in FIG. 3, the vehicle 100 may include a first inputter 120, a first display 130, a first communicator 140, a first controller 150, a first storage 151, a locking part 161, a starter 162, a light driver 163, a warning part 164, and a mirror driver 165.

The first inputter 120 may receive operational commands of various functions that can be performed in the vehicle 100.

The first inputter 120 may be provided in a head unit and a center fascia provided inside the vehicle 100, or may be provided as a touch panel of a vehicle terminal.

The first inputter 120 may include at least one physical button such as an operation on/off button for various functions, and a button for changing setting values of various functions.

The first inputter 120 may further include a lock button for receiving lock and unlock command of the door.

The first inputter 120 may receive identification information of the remote controller 200 (200a, and 200b). The identification information of the remote controller 200 (200a, and 200b) may be stored in advance in the first storage 151 when the vehicle is shipped.

The first display 130 displays information about the function being performed in the vehicle 100 and information input by the user.

The first display 130 may be provided in the cluster and the head unit, or may be provided as a display panel of the vehicle terminal.

The first display 130 may display authentication information about authentication success or authentication failure of the remote controller 200 (200a, and 200b), and may display startup information about startup on or startup off upon successful authentication.

The first communicator 140 may communicate directly with a plurality of remote controllers 200 (200a, and 200b).

The first communicator 140 may receive a control signal for controlling at least one load from at least one of the plurality of remote controllers 200 (200a, and 200b).

The plurality of remote controllers may include a plurality of fob type remote controllers, or may include a plurality of card type remote controllers, or may include at least one fob type remote controller and at least one card type remote controller.

That is, the plurality of remote controllers may represent two or more remote controllers, which is registered to the first storage 151.

Each of the plurality of remote controllers may include at least two key antennas.

The first communicator 140 may communicate with the two key antennas of the remote controller 200 through at least two of the plurality of car antennas 101 to 106 so that the authentication process of the remote controller communicating with the vehicle 100 is performed.

The first controller 150 may select two car antennas among the plurality of car antennas, transmit a signal for remote controller authentication through one of the two car antennas selected, store the transmission strength corresponding to the transmission power at the time of signal transmission, and store the transmission strength together with the identification information of any car antenna transmitting the signal.

The first controller 150 may transmit a signal for remote controller authentication through the other one of the two car antennas selected, store the transmission strength corresponding to the transmission power at the time of signal transmission, and store the transmission strength together with the identification information of another car antenna transmitting the signal.

The transmission strength corresponding to the transmission power for transmitting the signal for authentication of the remote controller may be the same for all the car antennas, may be all different, may be a predetermined strength, or may be different each time a signal for authentication of the remote controller is transmitted.

The vehicle 100 may further include a switch (not shown), a power feeder (not shown) connected to each of the plurality of car antennas, and a power supply (not shown) connected to any one of power feeder through the switch.

When transmitting the signal for authentication to the remote controller, the first controller 150 may connect the power feeder and the power supply of any one of the selected two car antennas using the switch, and the energy of the electromagnetic wave supplied from the feeder of any one of car antenna may be radiated to an external free space. When transmitting the signal for authentication to the remote controller, the first controller 150 may connect the power feeder and the power supply of other one of the selected two car antennas using the switch, and the energy of the electromagnetic wave supplied from the feeder of other one of car antenna may be radiated to an external free space.

When the first controller 150 transmits the signal for authentication to the remote controller, the first controller 150 may convert the digital transmission data into a low frequency transmission signal, transmit the converted low frequency transmission signal to any one of the car antenna, and transmit the converted low frequency transmission signal to the other car antenna after a predetermined time elapses.

The first controller 150 may receive the high frequency signal transmitted from the remote controller, obtain information on the strength of the signal received through the first and second key antennas corresponding to the signal transmitted through each car antenna in the received high frequency signal, and identify the received signal strength value from the obtained information.

The received signal strength value is a received signal strength indicator (RSSI) value, which is a power value of a signal received by the first and second key antennas.

The first controller 150 may convert the received high frequency signal into digital received data and obtain the received signal strength value of the two key antennas corresponding to the signal transmitted from the two car antennas using the converted digital received data.

That is, the first controller 150 may obtain the received signal strength values of the signals received by the first and second key antennas corresponding to any one of the car antenna, the received signal strength values of the signals received by the first and second key antennas corresponding to other of the car antenna, a distance value between any one car antenna and the first key antenna based on the strength value of the transmission signal of one car antenna and the strength value of the transmission signal strength value of other car antenna, a distance value between the other car antenna and the second key antenna, a distance value between the other car antenna and the first key antenna, and a distance value between the other car antenna and the second key antenna, respectively.

The first controller 150 may obtain the distance value between the car antennas of the vehicle 100 and the key antennas of the remote controller 200 using the following equation.

$$RSSI = -10n*\log*D + TXpower \quad \text{[equation 1]}$$

$$D = 10^{\wedge}((TXpower - RSSI)/(10*n)) \quad \text{[equation 2]}$$

TXpower is the signal strength value of the transmitted signal, D is the distance between any one of car antenna and any one of the key antennas, and n is a correction constant.

Also, n is related to propagation loss and may be 2 when there is no obstacle.

The first controller 150 may obtain the distance value between the two car antennas selected from the information stored in the first storage 151, obtain the distance value between the first and second key antennas of the remote controller based on the distance value between the obtained two car antennas and the distance values (i.e., four distance values) between the obtained car antenna and the key antenna, compare the obtained distance value with the previously stored distance value, identify that the authentication of the remote controller is successful when the obtained distance value is the same as the previously stored distance value, and control the operation of at least one load in response to the authentication success.

Obtaining the distance value between the first and second key antennas of the remote controller based on the distance value between the selected two car antennas and the distance values (i.e., four distance values) between the obtained car antenna and the key antenna may include obtaining using a trigonometric function.

The first controller 150 may identify that the authentication of the remote controller is successful when the distance value is within the error range between the obtained distance value and the previously stored distance value, and control the operation of at least one load in response to the authentication success.

The first controller 150 may also perform authentication of the remote controller by obtaining the distance value between the first and second key antennas provided in the remote controller through communication between the at least three car antennas and the first and second key antennas of the remote controller.

The first controller 150 may automatically control the operation of the locking part 161 to lock and unlock the door 111 upon successful authentication of the remote controller.

When the first controller 150 receives the door control signal from the authenticated remote controller, it is possible to control the locking part 161 provided at the at least one door so that the at least one door is unlocked.

When the first controller 150 receives the door control signal again from the authenticated remote controller, it is possible to control the locking part 161 provided at the at least one door so that at least one door is locked.

When the first controller 150 receives the door control signal from the authenticated remote controller, it is possible to identify the car antenna on which the door control signal is received and to control the locking and unlocking of the door corresponding to the position of the identified car antenna.

When the first controller 150 receives the door control signal from the plurality of car antennas, it is also possible to identify the car antenna having the highest signal strength of the received door control signal and to control locking and unlocking of the door corresponding to the identified car antenna position.

When the first controller 150 identifies that the authenticated remote controller is present within the predetermined distance, it is possible to control the locking and unlocking of the door and to control the folding and unfolding of the side mirrors, and it is also possible to control turning on and off of the lights.

When the input signal of the start button is received after the authentication of the remote controller is successful, the first controller 150 may control the starter 164 to start the engine.

The first controller 150 may receive an encryption signal from the remote controller after the authentication of the remote controller is successful and compare the received encryption signal with a previously stored encryption signal. When the received encryption signal is identical to the previously stored encryption signal, the first controller 150 may identify that the immobilizer authentication is successful, and when the input signal of the start button is received upon the success of the immobilizer authentication, it is also possible to control the starter 162 to start the engine.

The first controller 150 may control the start-off when the start-off command of the start button 162 is received.

The first controller 150 may control the warning part 164 upon authentication failure of the remote controller to output warning information. That is, the first controller 150 may cause a warning sound to be output or a warning lamp to be turned on when authentication of the remote controller fails.

The first controller 150 may include a memory (not shown) that stores algorithms for controlling the operation of components in the vehicle or data regarding a program that implements the algorithms and a processor (not shown) that performs the above-described operations using the data stored in the memory. The memory and the processor may be implemented as separate chips. Alternatively, the memory and the processor may be implemented on a single chip.

The first storage 151 may store identification information of the plurality of remote controllers.

The first storage 151 may also store encryption information of the plurality of remote controllers for the immobilizer authentication.

The first storage 151 may store the identification information of the first and second key antennas disposed in each remote controller.

The first storage 151 may store distance values between the first and second key antennas disposed in each remote controller. For example, the first storage 161 may store the distance value between the first and second key antennas provided in the fob type remote controller 200a, and store the distance value between the first and second key antennas provided in the card type remote controller 200b.

The distance value between the first and second key antennas provided in the remote controller 200a stored in the first storage 151 may be a value obtained and stored by learning to perform communication between the remote controller and the vehicle plural times. That is, the first storage may store the distance value obtained by learning as a reference value.

The distance value between the first and second key antennas provided in the remote controller 200a stored in the first storage 151 may be a value designed in manufacturing the remote controller.

The first storage 151 stores distance values between the plurality of car antennas provided in the vehicle. For example, the first storage 161 may store a distance value between the first car antenna and the second car antenna, a distance value between the first car antenna and the third antenna, a distance value between the first car antenna and the fourth car antenna, a distance value between the first car antenna and the fifth car antenna, a distance value between the first car antenna and the sixth car antenna, a distance value between the second car antenna and the third car antenna, a distance value between the second car antenna and the fourth car antenna, a distance value between the second car antenna and the fifth car antenna, a distance value between the second car antenna and the sixth car antenna, a distance value between the third car antenna and the fourth car antenna, a distance value between the third car antenna and the fifth car antenna, a distance value between the third car antenna and the sixth car antenna, a distance value between the fourth car antenna and the fifth car antenna, and a distance value between the fifth car antenna and the sixth car antenna.

The first storage 151 may store the strength value of the transmission power transmitted to the remote controller for authentication of the remote controller. The strength value of the transmission power may be different for each car antenna provided in the vehicle, or may be all the same.

The first storage 151 may include at least one type of storage medium among a flash memory type, a hard disk type, a multimedia card micro type, a card type memory (for example, SD or XD memory), a random access memory (RAM), a static random access memory (SRAM), a read only memory (ROM), an electrically erasable programmable read-only memory (EEPROM), a programmable read-only memory (PROM), a magnetic memory, a magnetic disk, or an optical disk.

The first storage 151 may be a memory implemented in a chip separately provided from the processor described above relation to the first controller 150, and may be implemented in a single chip with the processor.

The locking part 161 may lock and unlock the door 111 based on the control command of the first controller 150.

The vehicle may further include the start button (not shown) for receiving the start command for starting the engine.

The start button may receive the start command for starting the engine from the user, and receive the start off command from the user at the time of stopping.

The starter 162 may operate the starting motor based on the start-on command of the first controller 150 and stop the operation of the engine based on the start-off command of the first controller 150.

In the case of an electric vehicle, the starter 162 may cause the drive motor to be powered on based on the start-on command of the first controller 150 and to be block power applied to the drive motor based on the start-off command of the first controller 150.

The starter 162 may be started only based on the control command of the first controller 150 at the time of immobilizer authentication.

The light driver 163 may turn on the lights 113 or turn off the lights 113 based on the control command of the first controller 150.

The warning part 164 may output warning information about authentication failure of the remote controller. It is also possible that the warning part 164 outputs notification information about the authentication success of the remote controller.

The warning part 164 may include at least one of a warning sound output and a warning lamp.

The mirror driver 165 may fold or unfold the side mirrors by controlling the angle of the side mirrors 112 based on the control command of the first controller 150.

At least one component may be added or deleted corresponding to the performance of the components of the vehicle 100 illustrated in FIG. 3. It will be readily understood by those skilled in the art that the relative positions of the components may be changed corresponding to the performance or structure of the system.

Each of the components illustrated in FIG. 3 refers to a software component and/or a hardware component such as a Field Programmable Gate Array (FPGA) and an Application Specific Integrated Circuit (ASIC).

FIG. 4 is a control block diagram of the remote controller for performing communication with the vehicle in one form of the present disclosure. The remote controller 200 may include a second inputter 210, a second communicator 220, and a second controller 230.

The control configuration of the fob type remote controller 200a of the remote controller will be described.

As illustrated in FIG. 4, the remote controller 200 (200a) may include a second inputter 210, a second communicator 220, a detector 221, a second controller 230 and a second display 240.

The second inputter 210 may include a plurality of buttons provided on the body and receiving user commands from the user.

The second inputter 210 may be a button type that is pressed by the user, or a touch type that is touched by the user.

The second inputter 210 may receive the door control command for unlocking and locking the door. The second inputter 210 may include a lock button for receiving a lock command and an unlock button for receiving an unlock command.

The second inputter 210 may receive a turn on or off command of the lights, and may receive a folding or unfolding command of the side mirrors.

The second communicator 220 may perform communication through the car antenna of the vehicle or perform direct communication through the high frequency antenna (not shown) of the vehicle when the distance from the vehicle 100 is within the predetermined distance.

The second communicator 220 may transmit a control signal corresponding to the command input to the second inputter 210 to the vehicle based on the command of the second controller 230.

The second communicator 220 may transmit an authentication signal corresponding to the received signal strength received by the first and second key antennas to the vehicle as the high frequency signal based on the command of the second controller 230.

The detector 221 may detect the received signal strength of the first and second key antennas, respectively, and transmit the detected received signal strength to the second controller 230.

The detector 221 may be implemented with two sensors connected to the first and second key antennas, respectively.

The detector 221 may be implemented as one sensor that is selectively connected to the first and second key antennas. At this time, the second controller may control the switch (not shown) so that the detector is connected to the second key antenna after the predetermined time elapses after the detector is connected to the first key antenna.

The second controller 230 may control the operation of the second communicator 220 to transmit the control signal corresponding to the command received through the second inputter 210 to the vehicle.

The second controller 230 may control the operation of the second communicator 220 to transmit the authentication signal of the remote controller to the vehicle in response to reception of the signal transmitted from the car antenna of the vehicle.

More particularly, the second controller 230 may identify the strength of the signal received through the first key antenna and the strength of the signal received through the second key antenna when the signal for authentication of the remote controller transmitted through any one of the car antennas provided in the vehicle is received through the first key antennal and the second key antenna, change the information about the strength of the signal received at the first key antenna and the strength of the signal received at the second key antenna into the high frequency signal, and transmit the changed high frequency signal to the vehicle as the authentication signal.

The second controller 230 may identify the strength of the signal received through the first key antenna and the strength of the signal received through the second key antenna when the signal for authentication of the remote controller transmitted through other one of the car antennas provided in the vehicle is received through the first key antennal and the second key antenna, change the information about the strength of the signal received at the first key antenna and the strength of the signal received at the second key antenna into the high frequency signal, and transmit the changed high frequency signal to the vehicle as the authentication signal.

That is, the second controller 230 may transmit the high frequency signal corresponding to the strength of the signal received through the first and second key antennas to the vehicle in response to the reception of the signals transmitted from the two car antennas among the plurality of car antennas provided in the vehicle.

The second controller 230 may generate the received signal strength value for each key antenna for transmission of one car antenna and the received signal strength value for each key antenna for transmission of other car antenna as a frame, and convert the generated frame into the high frequency signal.

The second controller 230 may transmit the identification information of the remote controller when transmitting the control signal.

The second controller 230 may also transmit an encryption signal for the encryption information of the remote controller to the vehicle.

The second storage 240 may store the identification information of the remote controller, store the encryption information, and store the identification information of the vehicle.

The second storage 240 may store the identification information of the first and second key antennas.

The second storage 240 may store distance values between the first and second key antennas.

The second display 240 may display the authentication failure information or the authentication success information based on the control command of the second controller 230.

The second display 240 may display the transmission success information of the control signal based on the control command of the second controller 230.

The second display 240 may display the input information input to the second inputter 210.

As an example of the card type remote controller, the card type remote controller 200b may include only a second communicator, a detector, a second controller, and a second storage.

The card type remote controller 200b is the same as the fob type remote controller 200a except for the transmission configuration of the user input and the control signal corresponding to the user input in comparison with the fob type remote controller 200a.

In addition, the remote controller 200b may further include a power supply for transmitting driving power to the respective components. The power supply may include a rechargeable battery.

The power supply may convert the induced electromotive force provided by the antenna of the vehicle into the driving power and transmit the driving power to each components unit even if the battery is discharged.

Accordingly, the remote controller may communicate with the vehicle even if the charged amount of the battery is below the reference amount, thereby enabling the emergency start.

Further, when the battery is a chargeable battery, it is also possible to charge the battery using the induced electromotive force.

Figure 5:
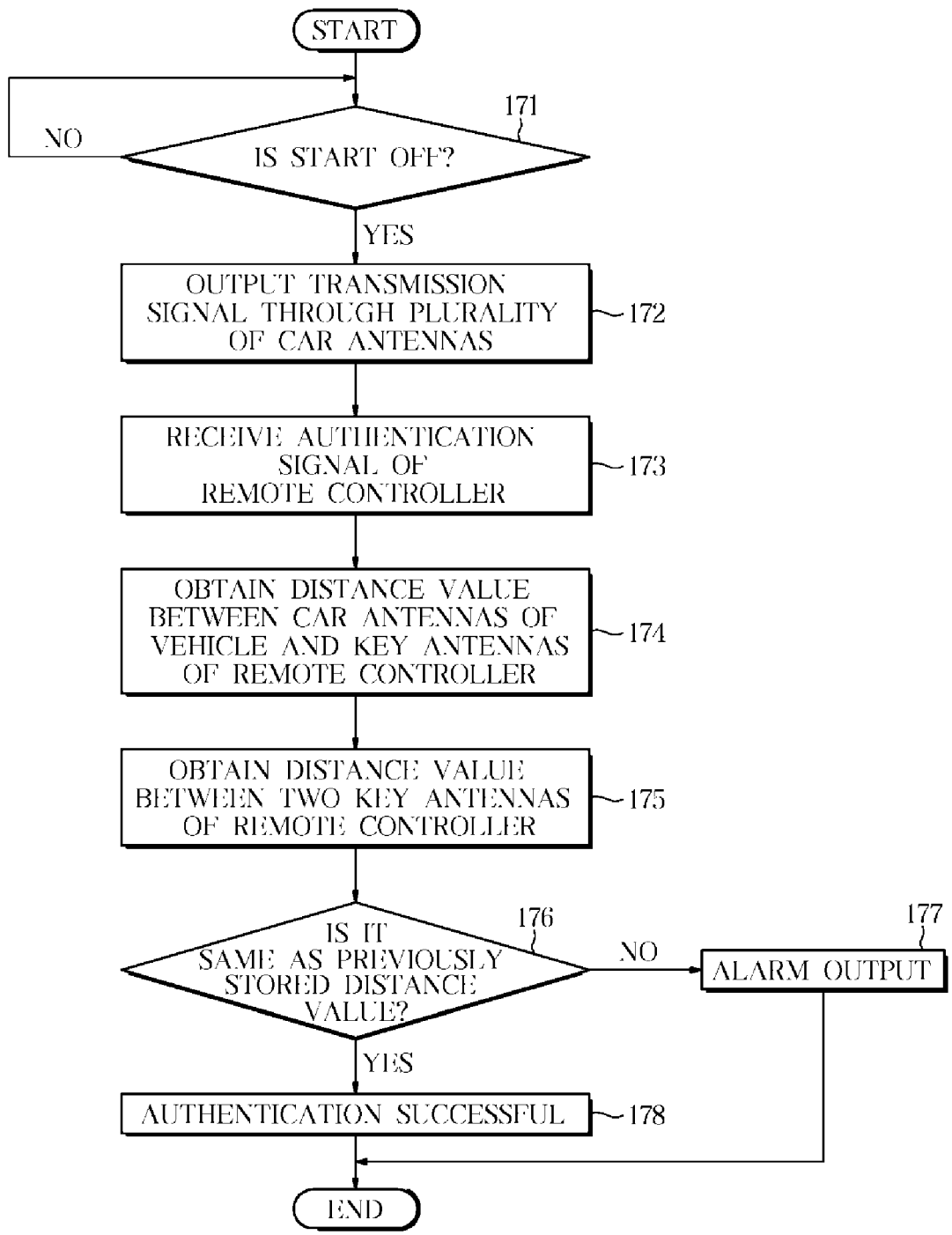
FIG. 5 is a control flowchart of the vehicle in one form of the present disclosure.

FIG. 5 is a control flowchart of the vehicle according to an form, and is described with reference to FIGS. 6 to 9.

The vehicle may periodically output (172) the transmission signal using the plurality of car antennas to recognize the remote controller and authenticate the remote controller when the startup is off (171).

In some forms of the present disclosure, a configuration for outputting the transmission signal by using first and fourth car antennas 101 and 104 among the plurality of car antennas will be described.

That is, the vehicle may select two car antennas among the plurality of car antennas and transmit the signal for authentication of the remote controller through the first car antenna 101 of the two car antennas selected, and transmit the signal for authentication of the remote controller through the fourth car antenna 104 after the predetermined time elapses.

The process of transmitting the signal using the first and fourth car antennas will be described in more detail.

The vehicle is configured to connect the power feeder of the fourth car antenna and the power supply using the switch and to radiate the energy of the electromagnetic wave supplied from the power feeder of the fourth car antenna to the external free space. After the predetermined time has elapsed, the power feeder and the power supply of the first car antenna may be connected using the switch, and the energy of the electromagnetic wave supplied from the power feeder of the first car antenna may be radiated to the external free space.

When the vehicle transmits the signal through the fourth car antenna 401, the vehicle may store the transmission strength corresponding to the transmission power at the time of signal transmission. When the vehicle transmits the signal through the first car antenna 101, the vehicle may store the transmission strength corresponding to the transmission power at the time of signal transmission.

Figure 6:
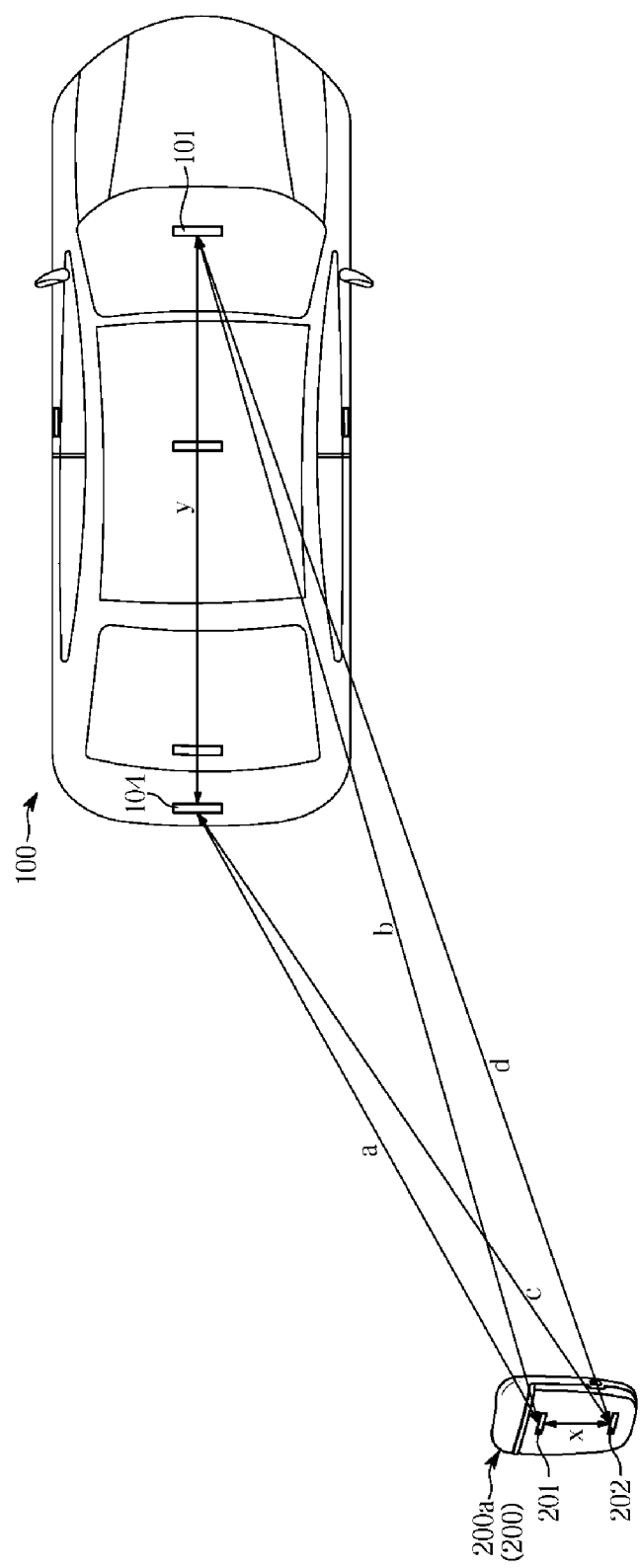
FIG. 6 is a view illustrating an example of transmission and reception between two car antennas of the vehicle and two key antennas of the remote controller in one form of the present disclosure.

As illustrated FIG. 6, the remote controller may receive the signal of the first car antenna using the first key antenna 201 in response to the signal transmission of the fourth car antenna 104, identify the received signal strength value of the signal received by the first key antenna 201 detected by the detector 221 when the signal of the fourth car antenna 104 is received, receive the signal of the fourth car antenna 104 using the second key antenna 202 in response to the signal transmission of the fourth car antenna 104, identify the received signal strength value of the signal received by the second key antenna 202 detected by the detector 221 when the signal of the fourth car antenna 104 is received, and store the received signal strength value of the signal received by the first and second key antennas 201 and 202.

The remote controller may receive the signal of the first car antenna using the first key antenna 201 in response to the signal transmission of the first car antenna 101 after the predetermined time elapses, identify the received signal strength value of the signal received by the first key antenna 201 detected by the detector 221 when the signal of the first car antenna 101 is received, receive the signal of the first car antenna 101 using the second key antenna 202 in response to the signal transmission of the first car antenna 101, identify the received signal strength value of the signal received by the second key antenna 202 detected by the detector 221 when the signal of the first car antenna 101 is received, and store the received signal strength value of the signal received by the first and second key antennas 201 and 202.

The remote controller may transmit the received signal strength value of the signal received by the first and second key antennas 201 and 202 corresponding to the signal transmission of the fourth car antenna 104 and the received signal strength value of the signal received by the first and second key antennas 201 and 202 corresponding to the signal transmission of the first car antenna 101 to the vehicle. At this time, the remote controller may generate the frame for the received signal strength values, convert the information about the generated frame into the high frequency signal, and transmit it to the vehicle.

The vehicle may receive an authentication signal for signal transmission of the first and fourth car antennas 101 and 104 from the remote controller when a remote controller is present within the predetermined distance (173).

That is, when the high frequency signal transmitted from the remote controller is received, the vehicle may demodulate the received high frequency signal to obtain received signal strength values of the received signal to the first and second key antennas 201 and 202 of the remote controller.

The vehicle may obtain the distance value between the first and fourth car antennas 101 and 104 and the first and second key antennas 201 and 202 based on the transmission strength values of the first and fourth car antennas 101 and 104 and the received signal strength values of the signals received by the first and second key antennas 201 and 202 of the remote controller (174).

As illustrated in FIG. 6, the vehicle may obtain the distance value a between the fourth car antenna 104 and the first key antenna 201 based on the transmission strength value of the fourth car antenna 104 and the received signal strength value of the first key antenna 201, obtain the distance value b between the fourth car antenna 104 and the second key antenna 202 based on the transmission strength value of the fourth car antenna 104 and the received signal strength value of the second key antenna 202, obtain the distance value c between the first car antenna 101 and the first key antenna 201 based on the transmission strength value of the first car antenna 101 and the received signal strength value of the first key antenna 201, and obtain the distance value d between the first car antenna 101 and the second key antenna 202 based on the transmission strength value of the first car antenna 101 and the received signal strength value of the second key antenna 202.

The received signal strength value may be a received signal strength indicator (RSSI) value, which is a power value of the signal received by the first and second key antennas 201 and 202.

The vehicle may obtain the distance values between the car antennas of the vehicle and the key antennas of the remote controller using the following equation.

$$D=10^{((TXpower-RSSI)/(10*n))}$$

TXpower is the signal strength value of the transmitted signal, D is the distance between any one of car antenna and any one of the key antennas, and n is a correction constant.

The vehicle may obtain a distance value x between the first and second key antennas 101 and 102 of the remote controller based on the distance value y between the first and fourth car antennas 101 and 104 and the distance values a, b, c, and d between the first and fourth car antennas 101 and 104 and the first and second key antennas 201 and 202 (175).

As illustrated in FIG. 6, the vehicle may obtain the distance value y between the first and fourth car antennas 101 and 104 from the information stored in the first storage 151, and obtain the distance value x between the first and second key antennas 201 and 202 based on the distance value y between the obtained first and fourth car antennas 101 and 104 and the distance values a, b, c, and d between the obtained car antenna and the key antenna.

The process of obtaining the distance value x between the first and second key antennas 201 and 102 of the remote controller will be described in more detail with reference to FIG. 7.

Figure 7:
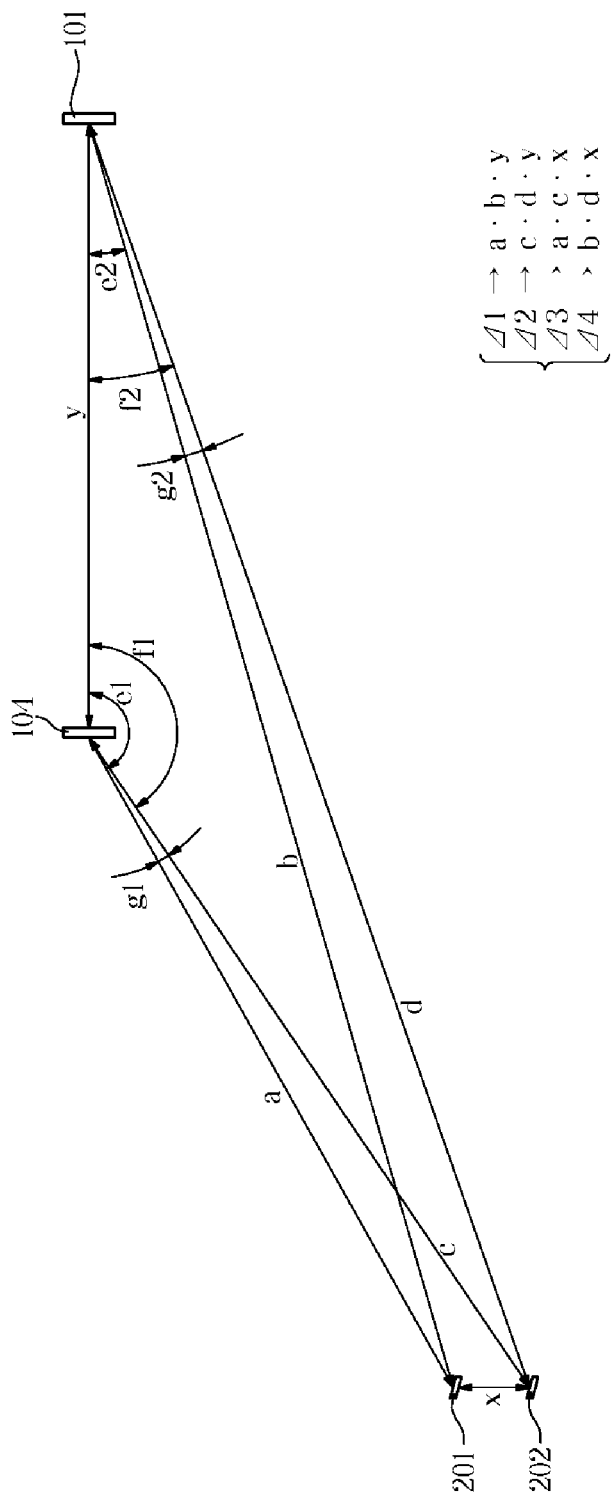
FIG. 7 is a view illustrating an example for calculating a distance value between two car antennas of the vehicle and two key antennas of the remote controller in one form of the present disclosure.

As illustrated in FIG. 7, a first triangle having a length (distance value y) between the first car antenna 101 and the fourth car antenna 104, a length (distance value a) between the fourth car antenna 104 and the first key antenna 201, and a length (distance value b) between the first car antenna 101 and the first key antenna 201 may be formed. A second triangle having the length (distance value y) between the first car antenna 101 and the fourth car antenna 104, a length (distance value c) between the fourth car antenna 104 and the second key antenna 202, and a length (distance value d) between the first car antenna 101 and the second key antenna 202 may be formed.

A third triangle having a length (distance value x) between the first key antenna 201 and the second key antenna 202, the length (distance value a) between the fourth car antenna 104 and the first key antenna 201, and the length (distance value c) between the fourth car antenna 104 and the second key antenna 202 may be formed. A fourth triangle having the length (distance value x) between the first key antenna 201 and the second key antenna 202, the length (distance value b) between the first car antenna 101 and the first key antenna 201, and the length (distance value d) between the first car antenna 101 and the second key antenna 202 may be formed.

The vehicle may identify whether the distance value a between the fourth car antenna 104 and the first key antenna 201 and the distance value b between the fourth car antenna 104 and the second key antenna 202 are the same. The vehicle may identify whether the distance value c between the first car antenna 101 and the first key antenna 201 and the distance value d between the first car antenna 101 and the second key antenna 202 are the same.

The vehicle may identify that the signal is received from the two car antennas spaced apart and the vehicle may perform the authentication of the remote controller when it is identified that the distance value a is different from the distance value b and the distance value c is different from the distance value d.

The vehicle calculates a first angle e1 for the first triangle and a first angle f1 for the second triangle to obtain an angle g1 of the third triangle.

$$\cos(e1)=(a^2+y^2-b^2)/(2*a*y)$$

$$\cos(f1)=(c^2+y^2-d^2)/(2*c*y)$$

The angle g1 of the third triangle has a value obtained by subtracting the first angle f1 for the second triangle from the first angle e1 for the first triangle.

The vehicle may calculate a second angle e2 for the first triangle and a second angle f2 for the second triangle in order to obtain the angle g2 of the fourth triangle.

$$Cos(e2)=(b^2+y^2-a^2)/(2*b*y)$$

$$Cos(f2)=(d^2+y^2-c^2)/(2*d*y)$$

The angle g2 of the fourth triangle has a value obtained by subtracting the second angle e2 from the second angle f2 with respect to the second triangle.

The vehicle may obtain the distance value xa between the first and second key antennas 101 and 102, which is the length of one side of the third triangle, using the angle g1 of the third triangle, the length of two sides of the third triangle, that is, the length (distance value a) between the fourth car antenna 104 and the first key antenna 201, and the length (distance value c) between the fourth key antenna 104 and the second key antenna 202.

$$Xa=a^2+c^2-(2*a*c*\cos(g1))$$

The vehicle may also obtain the distance value xb between the first and second key antennas 101 and 102, which is the length of one side of the third triangle, using the angle g2 of the fourth triangle, the length of two sides of the fourth triangle, that is, the length (distance value b) between the first car antenna 101 and the first key antenna 201, and the length (distance value d) between the first car antenna 101 and the second key antenna 202.

$$Xb=b^2+d^2-(2*b*d*\cos(g2))$$

The vehicle may compare the obtained distance value xa with the previously stored distance value x and identify whether the obtained distance value xa and the previously stored distance value x are the same (176).

Although some forms of the present disclosure have exemplified obtaining the distance value between the first and second key antennas on the basis of the trigonometric function using the cosine function value, it is also possible to obtain the distance value between the first and second key antennas using other trigonometric function.

When it is identified that the obtained distance value xa is different from the previously stored distance value x, the vehicle may identify that the authentication of the remote controller is failed and output an alarm (177) and when it is identified that the obtained distance value xa is the same as the previously stored distance value x (176), the vehicle may identify that the authentication of the remote controller succeeds (178) and control the operation of at least one load in response to the authentication success. Examples of authentication failure determination of the remote controller and at least one load operation control will be described later.

It is also possible for the vehicle to identify that the authentication of the remote controller is successful when it is identified that the obtained distance value is within the error range of the previously stored distance value.

The vehicle may further include comparing the obtained distance value xb with the previously stored distance value x and identifying whether the obtained distance value xb and the previously stored distance value x are the same.

It is also possible for the vehicle to identify that the authentication of the remote controller is successful when it is determined that the obtained distance value xa and distance value xb are the same.

In some forms of the present disclosure, when the signal is transmitted using the first and fourth car antennas provided in the vehicle, the distance value between the first and second key antennas may be obtained based on the received signal strength of the first and second key antennas of the remote controller and the configuration for authenticating the remote controller based on the obtained distance value between the first and second key antennas has been described.

This is merely an example. When signals are transmitted using three or more car antennas, not the two car antennas provided in the vehicle, it is also possible to obtain the distance value between the first and second key antennas based on the received signal strength of the first and second key antennas of the remote controller and authenticate the remote controller based on the obtained distance value.

As illustrated in FIG. 8A, the vehicle may sequentially drive the plurality of car antennas 101 to 106 to transmit the signal for authenticating the remote controller. At this time, the remote controller may transmit the received signal strength values of the first and second key antennas corresponding to the reception of the signals for each of the plurality of car antennas, to the vehicle.

For example, the remote controller may transmit received signal strength value v11 of the first key antenna 201 and the received signal strength value v12 of the second key antenna 202 for reception of the signal of the first car antenna 101 and received signal strength value v21 of the first key antenna 201 and the received signal strength value v22 of the second key antenna 202 for reception of the signal of the second car antenna 102, to the vehicle. The remote controller may transmit received signal strength value ve1 of the first key antenna 201 and the received signal strength value ve2 of the second key antenna 202 for reception of the signal of the third car antenna 103, and received signal strength value v41 of the first key antenna 201 and the received signal strength value v42 of the second key antenna 202 for reception of the signal of the fourth car antenna 104, to the vehicle. The remote controller may transmit received signal strength value v51 of the first key antenna 201 and the received signal strength value v52 of the second key antenna 202 for reception of the signal of the fifth car antenna 105, and received signal strength value v61 of the first key antenna 201 and the received signal strength value v62 of the second key antenna 202 for reception of the signal of the sixth car antenna 101 to the vehicle.

As illustrated in FIG. 8B, the vehicle may obtain the distance value between the car antennas and the key antennas based on the received signal strength value of the first and second key antennas corresponding to the reception of the signals for each of the plurality of car antennas, respectively.

For example, the vehicle may obtain the distance value S11 between the first car antenna 101 and the first key antenna 201 corresponding to the received signal strength value v11 of the first key antenna 201, the distance value S12 between the first car antenna 101 and the second key antenna 202 corresponding to the received signal strength value v12 of the second key antenna 202, the distance value S21 between the second car antenna 102 and the first key antenna 201 corresponding to the received signal strength value v21 of the first key antenna 201, and the distance value S22 between the first car antenna 101 and the second key antenna 202 corresponding to the received signal strength value v22 of the second key antenna 202.

As illustrated in FIG. 8B, the vehicle acquires the distance values x1 to x6 between the first and second key antennas by each triangles formed by the first and second key antennas and each car antennas.

When it is identified that two triangles having one side of the distance between the first and second key antennas 101 and 102 are formed, it is possible to identify that the authentication of the remote controller is likely to be successful.

The example of authentication failure determination of the remote controller will be described.

When it is identified that the distance value a and the distance value b are the same, the distance value c and the distance value d are the same, the distance value a and the distance value b are the same, and the distance value c and the distance value d are the same, the vehicle may identify that the authentication signal transmitted from the remote controller is not the signal corresponding to the signal received from the two car antennas spaced apart from the vehicle.

Figure 9:
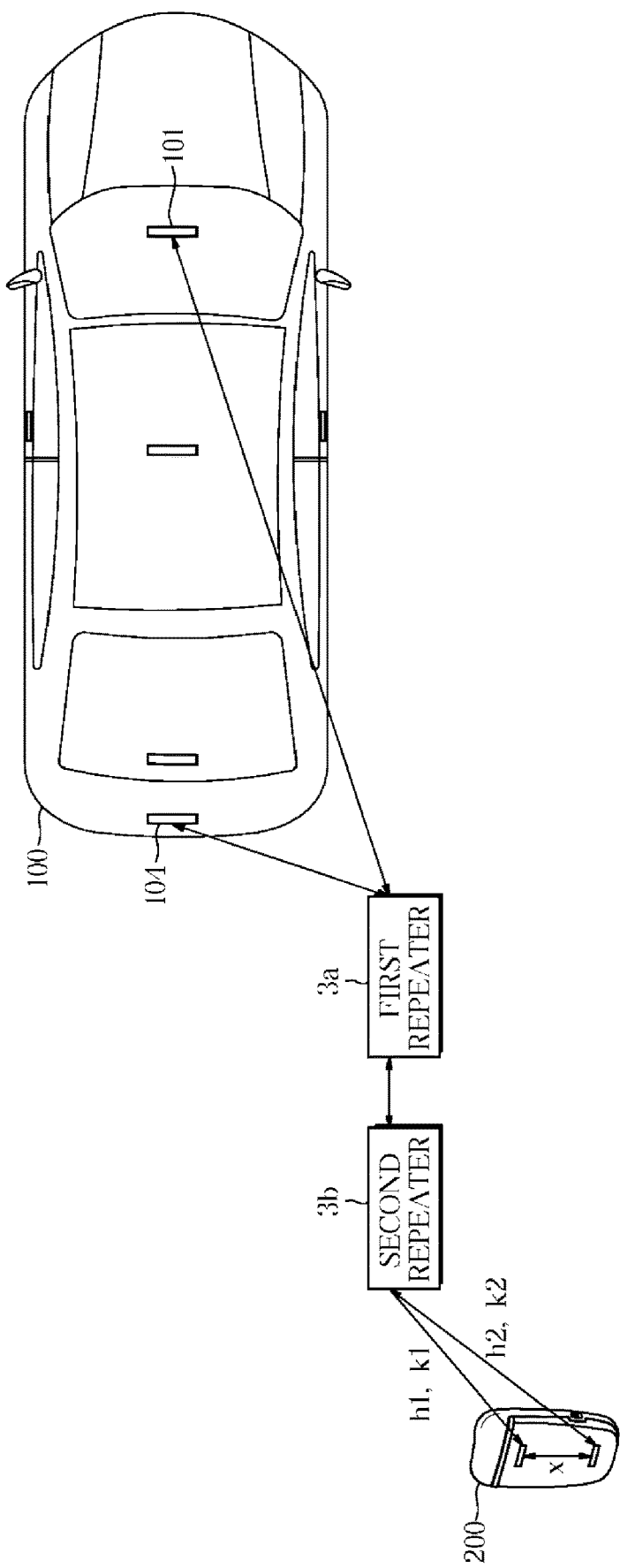
FIG. 9 is a view illustrating an example of an authentication failure of the vehicle and the remote controller in one form of the present disclosure.

That is, as illustrated in FIG. 9, a case where two repeaters 3a and 3b are arranged between the vehicle and the remote controller, and the vehicle and the remote controller communicate with each other through the two repeaters 3a and 3b will be described.

The vehicle may sequentially transmit transmission signals through the first car antenna 101 and the fourth car antenna 104. At this time, a first repeater 3a located close the vehicle may sequentially receive signals transmitted from the vehicle and may sequentially transmit the sequentially received signals to a second repeater 3b. The second repeater 3b located close to the remote controller may sequentially receive signals from the first repeater 3a and may sequentially transmit the signals to the remote controller.

The remote controller may receive the signal of the second repeater 3b through the first and second key antennas and may sequentially receive the signals of the first car antenna 101 and the fourth car antenna 104. The remote controller may transmit the received signal strength values of the first and second key antennas corresponding to the signal reception of the first car antenna 101 and the received signal strength values of the first and second key antennas corresponding to the signal reception of the fourth car antenna 104 as the high frequency signal.

At this time, the second repeater 3b located close to the remote controller may transmit the high frequency signal of the remote controller to the first repeater 3a located close to the vehicle.

The first repeater 3a located close to the vehicle may transmit the received high frequency signal to the vehicle.

The vehicle may demodulate the received high frequency signal and obtain the received signal strength value of the first and second key antennas corresponding to the signal transmission of the first car antenna 101 and the received signal strength value of the first and second key antennas corresponding to the signal transmission of the fourth car antenna 104, and obtain the distance value between the car antennas and the key antennas using the obtained received signal strength value.

At this time, when the remote controller 200 sequentially receives the signal of the first car antenna 101 and the signal of the fourth car antenna 104 from the second repeater 3b, the remote controller 200 may not obtain the received signal strength value of the first key antenna corresponding to the signal reception of the first key antenna 101 and the received signal strength value of the first key antenna corresponding to the signal reception of the fourth key antenna 104 because the remote controller 200 detects the received signal strength for reception of the signal transmitted from the second repeater 3b.

That is, the remote controller may receive the signal of the second repeater 3b corresponding to the signal transmission of the first car antenna 101. At this time, the remote controller may obtain the received signal strength value of the first key antenna corresponding to the signal reception of the second repeater 3b and the received signal strength value of the second key antenna corresponding to the signal reception of the second repeater 3b. The remote controller may receive the signal of the second repeater 3b corresponding to the signal transmission of the fourth car antenna 104. At this time, the remote controller may obtain the received signal strength value of the first key antenna corresponding to the signal reception of the second repeater 3b and the received signal strength value of the second key antenna corresponding to the signal reception of the second repeater 3b.

The first and second key antennas of the remote controller may receive a signal from the second repeater 3b by two times, and the received signal strength values of the signals received twice may be equal to each other.

That is, the received signal strength value, which is firstly received by the first key antenna of the remote controller, and the received signal strength value, which is secondarily received by the first key antenna of the remote controller, may be the same, and the received signal strength value, which is firstly received by the second key antenna of the remote controller, and the received signal strength value received, which is secondarily received by the second key antenna of the remote controller, may be the same.

Accordingly, the remote controller may fail to transmit a received signal strength value h1 of the first key antenna corresponding to the signal reception of the first car antenna 101, a received signal strength value k1 of the first key antenna corresponding to the signal reception of the fourth car antenna 104, a received signal strength value h2 of the second key antenna corresponding to the signal reception of the first car antenna 101 and a received signal strength value k2 of the second key antenna corresponding to the reception of the signal of the fourth car antenna 104, and may transmit the received signal strength value corresponding to the signal reception of the second repeater 3b to the vehicle.

At this time, the four received signal strength values may be the same or similar to each other.

Thereby, the vehicle may obtain the distance value between the first key antenna and the second key antenna corresponding to the distance value between the first car antenna and the fourth car antenna. At this time, since the obtained distance value between the first key antenna and the second key antenna is different from the previously stored distance value, the vehicle may output information on authentication failure of the remote controller.

The example of control of at least one load after the authentication of the remote controller is successful will be described.

The vehicle may perform unlocking of the door 111, unfold the side mirrors, and turn on the lights when it is identified that the authenticated remote controller is present within the predetermined distance. The vehicle may also turn on the lights when the external illuminance is less than the reference illuminance.

The vehicle may also lock the door 111, fold the side mirrors, and turn off the lights when it is identified that the authenticated remote controller is present beyond the predetermined distance.

It is also possible for the vehicle to lock the door when the door control signal is received from the authenticated remote controller, and to unlock the door when the door control signal is received again.

When the input signal of the start button is received after the authentication of the remote controller is successful, the vehicle may control the starter 162 to start the engine.

In addition, the vehicle may receive the encryption signal from the remote controller after the authentication of the remote controller is successful, compare the received encryption signal with the previously stored encryption signal, and identify that the immobilizer authentication is successful when the received encryption signal and the previously stored encryption signal are the same. When the input signal of the start button is received at the time the immobilizer authentication succeeds, it is also possible to control the starter 162 to start the engine.

The vehicle may turn off the ignition when the start-off command of the start button 162 is received.

As is apparent from the above description, some forms of the present disclosure can prevent theft of the vehicle by authenticating the remote controller by using a distance value between at least two antennas provided in a vehicle and a distance value between at least two antennas provided in the remote controller, wherein the theft occurs through indirect communication between the vehicle and the remote controller by the repeater. That is, the disclosure can prevent the vehicle from being stolen from the Relay Station Attack (RSA).

The present disclosure can improve the accuracy of the position recognition of the remote controller and improve the accuracy of the authentication of the remote controller. Therefore, it may be possible to increase the security of the vehicle and increase the range of utilization of the convenience functions of the user.

As described above, in some forms the present disclosure, the security for communication with the remote controller is enhanced, thereby improving the quality and merchantability of the vehicle, further improving the convenience of the user and the safety of the vehicle, and securing the competitiveness of the product.

Meanwhile, some forms of the present disclosure may be embodied in the form of a recording medium storing instructions executable by a computer. The instructions may be stored in the form of program code and, when executed by a processor, may generate a program module to perform the operations of the disclosed forms. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:

1. A remote controller comprising:
   a first key antenna;
   a second key antenna disposed at a predetermined distance from the first key antenna;
   a detector configured to detect a strength of a signal received by the first key antenna and a strength of a signal received by the second key antenna; and
   a controller configured to:
     convert information corresponding to a strength of at least two signals received by the first key antenna and a strength of at least two signals received by the second key antenna into a high frequency signal; and
     control transmission of the high frequency signal.

2. The remote controller of claim 1, wherein the remote controller further comprises:
   a communicator configured to:
     communicate with a vehicle; and
     transmit the high frequency signal to the vehicle in response to a control command of the controller.

3. The remote controller of claim 2, wherein the remote controller further comprises:
   an inputter configured to receive an user input, wherein the controller is configured to:
     convert a control signal corresponding to the user input into the high frequency signal; and
     control the communicator to transmit the high frequency signal.

4. The remote controller of claim 1, wherein the first key antenna and the second key antenna comprise:
   a low frequency antenna configured to receive a signal for authentication transmitted from at least two car antennas provided in the vehicle.

5. The remote controller of claim 4, wherein the controller is configured to control transmission of encryption information for ignition when the authentication is successful.

6. A vehicle comprising:
   a plurality of car antennas configured to be spaced apart from each other;
   a storage configured to store a distance value between a first key antenna and a second key antenna provided in a remote controller; and
   a controller configured to:
     select at least two car antennas of the plurality of car antennas;
     control transmission of signals through the at least two car antennas of the plurality of car antennas;
     when a signal strength of the first key antenna and a signal strength of the second key antenna are received from the remote controller, obtain a distance value between the first key antenna and the second key antenna based on the received signal strength and a transmission strength of the at least two car antennas of the plurality of car antennas, wherein the signal strength of the first key antenna is a signal strength of at least two signals received by the first key antenna and the signal strength of the second key antenna is a signal strength of at least two signals received by the second key antenna; and
     authenticate the remote controller based on the obtained distance value and the stored distance value.

7. The vehicle of claim 6, wherein:
   the storage is configured to store distance values of the plurality of car antennas; and
   the controller is configured to:
     obtain a distance value between the at least two car antennas of the plurality of car antennas, the first key antenna and the second key antenna based on the transmission strength of the at least two car antennas of the plurality of car antennas and the signal strength of the first key antenna and the second key antenna;

obtain the distance value between the first key antenna and the second key antenna based on the distance value obtained between the at least two car antennas of the plurality of car antennas, the first key antenna and the second key antenna and the stored distance value.

8. The vehicle of claim 7, wherein the controller is configured to:

obtain a distance value between a first car antenna of the selected two car antennas and the first key antenna based on a transmission strength of the first car antenna of the selected two car antennas and the signal strength of the first key antenna;

obtain a distance value between the first car antenna of the selected two car antennas and the second key antenna based on the transmission strength of the first car antenna of the selected two car antennas and the signal strength of the second key antenna;

obtain a distance value between a second car antenna of the selected two car antennas and the first key antenna based on a transmission strength of the second car antenna of the selected two car antennas and the signal strength of the first key antenna; and obtain a distance value between the second car antenna of the selected two car antennas and the second key antenna based on the transmission strength of the second car antenna of the selected two car antennas and the signal strength of the second key antenna.

9. The vehicle of claim 7, wherein the controller is configured to:

obtain a distance value between the first key antenna and the second key antenna based on the transmission strength of the plurality of car antennas the signal strength of the first key antenna and the signal strength of the second key antenna; and store the obtained distance value in the storage as a reference value.

10. The vehicle of claim 6, wherein the controller is configured to:

compare encryption information transmitted from the remote controller with previously stored encryption information;

perform an immobilizer authentication when authenticating the remote controller is successful; and control an ignition when the immobilizer authentication is successful.

11. The vehicle of claim 6, wherein the vehicle further comprises:

a communicator configured to receive a high frequency signal transmitted from the remote controller, wherein when the high frequency signal is received, the controller is configured to demodulate the high frequency signal to obtain the signal strength of the first key antenna and the signal strength of the second key antenna.

12. The vehicle of claim 6, wherein the vehicle further comprises:

side mirrors; and a mirror driver configured to fold and unfold the side mirrors, wherein the controller is configured to control the mirror driver such that the side mirrors are folded or unfolded when authenticating the remote controller is successful.

13. The vehicle of claim 6, wherein the vehicle further comprises:

lights; and a light driver configured to turn on and turn off the lights, wherein the controller is configured to control the light driver such that the lights are turned on or turned off when authenticating the remote controller is successful.

14. The vehicle of claim 6, wherein the vehicle further comprises:

a door; and a locking part configured to lock and unlock the door, wherein the controller is configured to control the locking part such that the door is locked and unlocked when authenticating the remote controller is successful.

15. The vehicle of claim 6, wherein the plurality of car antennas comprises a low frequency antenna transmitting an authentication signal for authenticating the remote controller.

16. The vehicle of claim 6, wherein the vehicle further comprises:

a warning part, wherein the controller is configured to control the warning part when authenticating the remote controller fails.

17. A method for controlling a vehicle, the method comprising:

selecting at least two car antennas of a plurality of car antennas;

controlling transmission of signals through the at least two car antennas of the plurality of car antennas;

when a signal strength of a first key antenna and a signal strength of a second key antenna are received from a remote controller, obtaining a distance value between the first key antenna and the second key antenna based on the received signal strength and a transmission strength of the at least two car antennas of the plurality of car antennas, wherein the signal strength of the first key antenna is a signal strength of at least two signals received by the first key antenna and the signal strength of the second key antenna is a signal strength of at least two signals received by the second key antenna;

identifying whether an authentication of the remote controller is successful based on the obtained distance value and a previously stored distance value;

controlling operation of at least one load provided in a vehicle when the authentication of the remote controller is successful; and outputting warning information when the authentication of the remote controller fails.

18. The method of claim 17, wherein obtaining the distance value between the first key antenna and the second key antenna comprises:

obtaining a distance value between the at least two car antennas of the plurality of car antennas, the first key antenna and the second key antenna based on the transmission strength of the at least two car antennas of the plurality of car antennas and the signal strength of the first key antenna and the second key antenna; and obtaining the distance value between the first key antenna and the second key antenna based on the distance value obtained between the at least two car antennas of the plurality of car antennas, the first key antenna and the second key antenna and the previously stored distance value.

19. The method of claim 18, wherein obtaining the distance value between the at least two car antennas of the plurality of car antennas, the first key antenna and the second key antenna comprises:

obtaining a distance value between a first car antenna of the selected two car antennas and the first key antenna based on a transmission strength of the first car antenna of the selected two car antennas and the signal strength of the first key antenna;

obtaining a distance value between the first car antenna of the selected two car antennas and the second key antenna based on the transmission strength of the first car antenna of the selected two car antennas and the signal strength of the second key antenna;

obtaining a distance value between a second car antenna of the selected two car antennas and the first key antenna based on a transmission value of the second car antenna of the selected two car antennas and the signal strength of the first key antenna; and obtaining a distance value between the second car antenna of the selected two car antennas and the second key antenna based on the transmission strength of the second car antenna of the selected two car antennas and the signal strength of the second key antenna.

20. The method of claim 17, wherein the method further comprises:

obtaining a distance value between the first key antenna and the second key antenna based on the transmission strength of the plurality of car antennas, the signal strength of the first key antenna and the signal strength of the second key antenna; and storing the obtained distance value as a reference value.

21. The method of claim 17, wherein controlling operation of at least one load comprises:

requesting transmission of encryption information to the remote controller when the authentication of the remote controller is successful;

when the encryption information is received from the remote controller, performing an immobilizer authentication by comparing the encryption information with previously stored encryption information; and controlling an ignition when the immobilizer authentication is successful.

22. The method of claim 17, wherein controlling operation of at least one load comprises:

unlocking a door;
unfolding side mirrors; and
turning on lights.

* * * * *